(12) United States Patent
Ahn

(10) Patent No.: US 11,567,949 B2
(45) Date of Patent: Jan. 31, 2023

(54) DATA DISCOVERY SOLUTION FOR DATA CURATION

(71) Applicant: PRAXI DATA, INC., Hillsborough, CA (US)

(72) Inventor: Andy Tae Ahn, Hillsborough, CA (US)

(73) Assignee: PRAXI DATA, INC., Hillsborough, CA (US)

( * ) Notice: Subject to any disclaimer, the term of this patent is extended or adjusted under 35 U.S.C. 154(b) by 314 days.

(21) Appl. No.: 17/062,242

(22) Filed: Oct. 2, 2020

(65) Prior Publication Data

US 2021/0089547 A1 Mar. 25, 2021

Related U.S. Application Data

(63) Continuation of application No. 16/514,983, filed on Jul. 17, 2019, now Pat. No. 10,795,899.

(60) Provisional application No. 62/699,518, filed on Jul. 17, 2018.

(51) Int. Cl.
| | |
|---|---|
| G06F 16/2457 | (2019.01) |
| G06F 9/50 | (2006.01) |
| A63F 13/79 | (2014.01) |
| G06N 20/00 | (2019.01) |

(52) U.S. Cl.
CPC ........ *G06F 16/24578* (2019.01); *A63F 13/79* (2014.09); *G06F 9/5005* (2013.01); *G06F 16/24575* (2019.01); *G06N 20/00* (2019.01)

(58) Field of Classification Search
None
See application file for complete search history.

(56) References Cited

U.S. PATENT DOCUMENTS

| | | |
|---|---|---|
| 6,029,178 A | 2/2000 | Martin et al. |
| 8,983,976 B2 | 3/2015 | Paruchuri et al. |
| 9,037,568 B1 | 5/2015 | Xian et al. |
| 2013/0017524 A1* | 1/2013 | Barborak ......... G06N 5/04 434/322 |
| 2017/0091809 A1 | 3/2017 | Liu et al. |
| 2019/0295437 A1* | 9/2019 | Rubinstein ......... A61B 5/742 |
| 2020/0004882 A1 | 1/2020 | Priyanka et al. |
| 2020/0026708 A1 | 1/2020 | Ahn |

* cited by examiner

*Primary Examiner* — Amresh Singh
(74) *Attorney, Agent, or Firm* — Perkins Coie LLP; Colin Fowler

(57) ABSTRACT

Disclosed are methods and systems for a data discovery solution which harnesses the power of crowdsourcing to improve automated data curation. This is done in two complimentary ways: (a) large scale collective curation through anonymized multi-tenancy, and (b) and through internet scale matching and validation gaming platform using mobile application game. The result is the most extensive library of semantic-technical mappings of the enterprise data, which are immediately at hand to provide a fast, easy and a good understanding of the enterprise data. The data discovery solution forms a gateway for governing and unlocking value from big data.

18 Claims, 10 Drawing Sheets

DATA DISCOVERY SOLUTION FOR DATA CURATION

CROSS-REFERENCE TO RELATED APPLICATION

This application is a continuation of U.S. patent application Ser. No. 16/514,983, filed Jul. 17, 2019, which claims benefit of and priority to Provisional Patent Ser. No. 62/699,518 filed on Jul. 17, 2018. The aforementioned applications are incorporated herein by reference in their entirety.

BACKGROUND OF THE INVENTION

Data Curation is a means of managing data that makes it more useful for users engaging in data discovery and analysis. Data curation is the art of creating value from data. Data curators evaluate data from diverse sources, categorize and integrating in into metadata repositories that are many times more valuable than the raw source material. Data Curation includes data identification/discovery, data authentication, archiving, management, preservation, retrieval, representation and other enrichment. During this process, data might be annotated, tagged, presented, and published for various purposes. The goal is to add to the value of data, so it can be reused in as many business applications as possible. Curation also involve categorization as well—primarily to make it searchable as well as to allow proper handling as in the case for sensitive personal data or financial data.

Data curation was much more manageable when enterprises only had a few data sources and moderate volume to extract business insights from. Today this has changed, with the proliferation of big data enterprises have many more disparate data sources to extract data from (typically referred to as volume, variety and velocity), making it much more difficult or impossible to maintain a consistent method to curate data. Further complicating the problem is the fact that much of today's data is created in an ad hoc way that can't be anticipated by the people intended to use data for analysis.

A significant number of companies employ data curators, who are people that curate the data manually. However, the problem with such an approach is that it is not scalable. Further since the data keeps changing and increasing at an ever-increasing pace, any curated data can become stale or invalid even before the curation is complete, that is, it is very difficult to achieve an up to date, uniform, and complete picture of the data.

Some companies use artificial intelligence sometimes called machine learning or deep learning to create identification models which can then be used to automatically discover and categorize large amounts of data. However, these solutions are limited by the expertise needed to create models and to computing resources that can be employed for complicated workflows. Further the results of this machine learning need to be validated to reduce the number of false positives to a manageable amount so that there can actually be value from these insights.

SUMMARY

Disclosed are methods and systems for a data discovery solution which harnesses the power of crowdsourcing to improve automated data curation. This is done in two complimentary ways: (a) large scale collective curation through anonymized multi-tenancy, and (b) and through internet-scale matching and validation gaming platform using mobile application games. This solution provides a comprehensive way to organize data for manual or automated creation methods. The result is the most extensive library of semantic-technical mappings of the enterprise data, which are immediately at hand to provide a fast, easy, current and understanding of the enterprise data. The data discovery solution forms a gateway for governing and unlocking value from big data.

DETAILED DESCRIPTION

Figure 1:
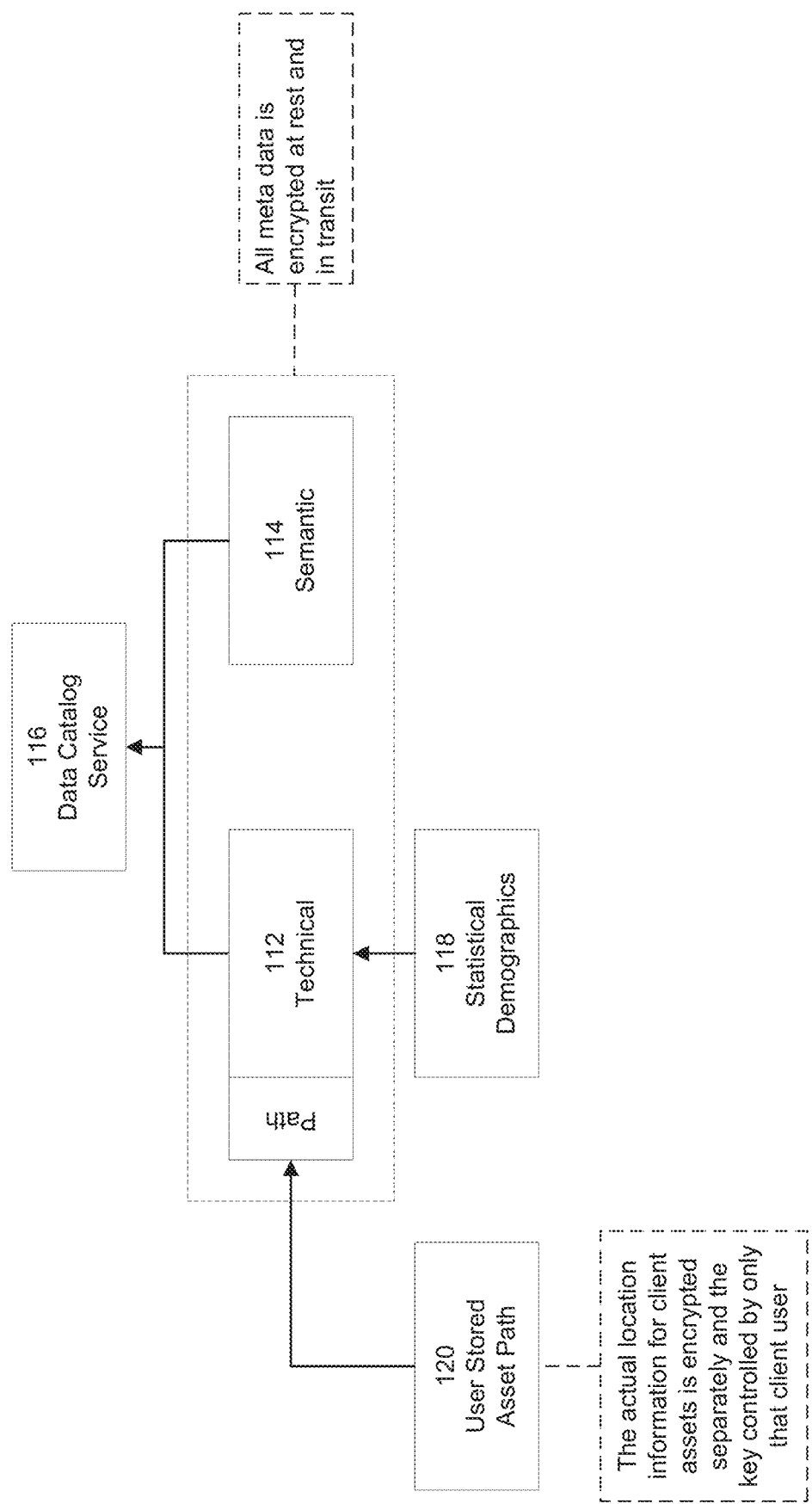
FIG. 1 is a block diagram depicting large scale collective curation aspect of a data discovery solution, consistent with various embodiments.

FIG. 1 is a block diagram depicting large scale collective curation aspect of a data discovery solution, consistent with various embodiments. The data discovery solution harnesses the power of crowdsourcing to improve automated data curation.

The data discovery solution improves the data organization using (a) large scale collective curation through anonymized multi-tenancy, and (b) and through internet scale matching and validation gaming platform using mobile application game. In the large scale collective curation, pattern matches of data obtained for one client can be generalized and used for another client while still maintaining the anonymity of the first client. The technical data 112, e.g., tables, schemas, databases, or other data concepts, are obtained from a first set of source locations of a first client, and the semantic data can be gathered using crowd sourcing techniques. The semantic data 114, such as ontologies, help to contextually interpret the heterogeneous technical data by associating the data concepts with ontology classes. A semantic mapping (e.g., linking of data concepts with ontology classes) helps machines to interpret the technical data to comprehend the corresponding context. Ontologies are sets of machine-readable controlled vocabularies that provide the explicit specification of a conceptualization of a domain. Moreover, ontology orchestrates the domain concepts (both generalized and specialized) in a hierarchical order to foster this hierarchical modeling through the logical relations among them. Such arrangement of concepts provides ontologies with the highest degree of semantic richness of all common models for knowledge representation. The semantic mapping can then be used for managing data in a modern data catalog 116. In a modern data catalog 116, all this semantic data is collected along with information about the assets (technical metadata) themselves and organized within a catalog interface that is more readily searchable and browsable than the legacy systems.

The data discovery solution can be implemented as a cloud service, which can be used by multiple clients. In some embodiments, the data discovery solution can be implemented as virtual machines (VM), which can be deployed in a public cloud, private, or a hybrid of the two. While the data discovery solution can be used across multiple clients and data sources, the technical data of a particular client is still secure, private, and not accessible by another client. The data discovery solution will store summary and statistical demographic technical metadata 118 (i.e., generalizable metadata) of a particular client but store the private client information such as location information, or access credential of the data assets (files and tables) in a separate encrypted store 120. As seen in the example in FIG. 1, all of the metadata is encrypted, the client data asset location and connection information will be encrypted with a key that is controlled by the client. The data discovery solution may not store these client specific customer keys to safe guard confidential metadata.

Alternatively, according to another example of the data discovery solution, the metadata may be bifurcated into private metadata (such as customer phone numbers) and generalizable metadata (such as average age of the population). Whereas the private metadata is encrypted and wholly controlled by the client in the manner described above, generalizable metadata may be unencrypted and accessible to the public. At runtime, both the private and the generalized metadata are unencrypted and are combined to form a complete file.

Figure 2:
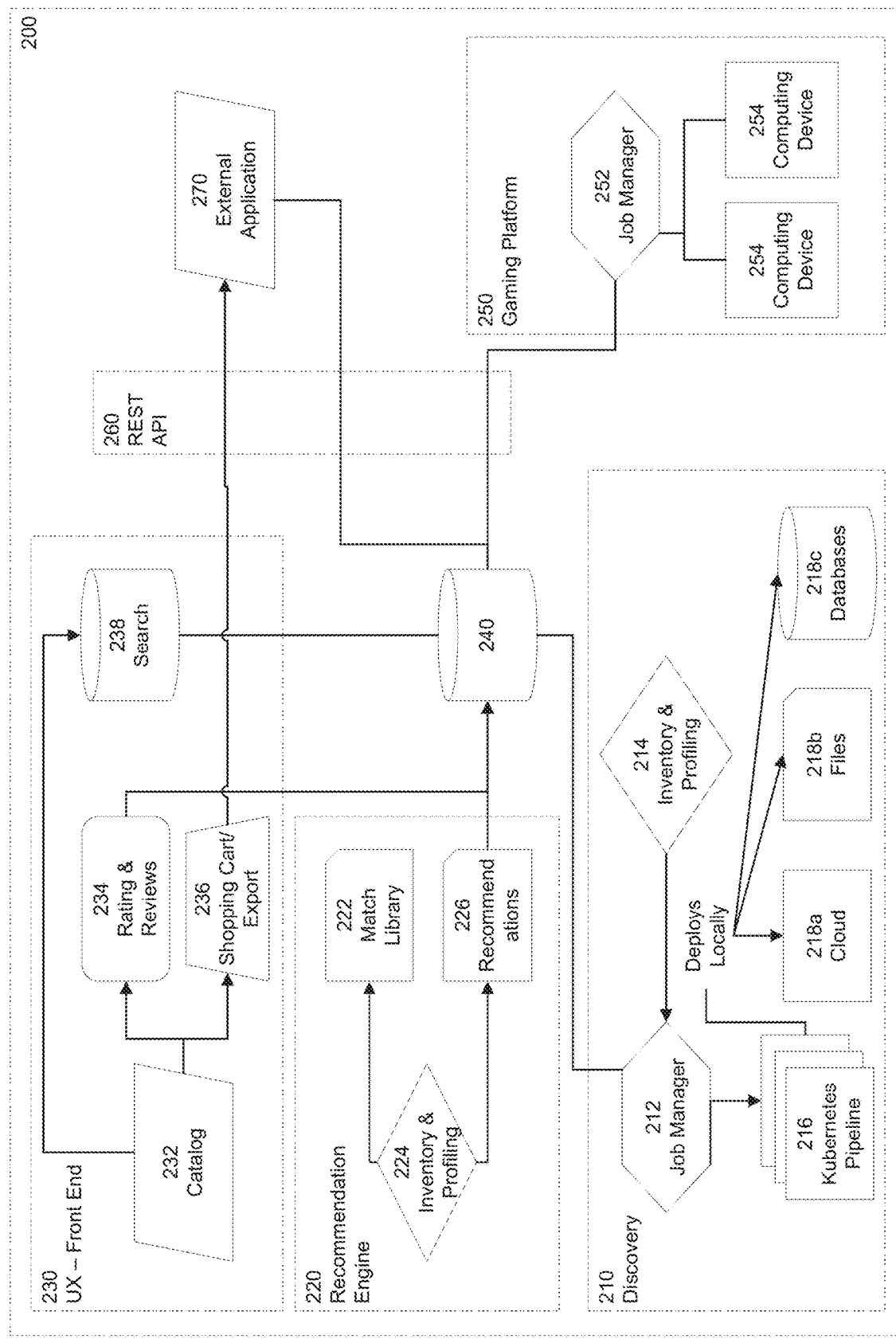
FIG. 2 is a block diagram of an example of a system for data discovery, consistent with various embodiments.

FIG. 2 is a block diagram depicting the high-level components of service-based architecture illustrates an example of the data discovery system 200 that is consistent with various embodiments described herein. At a functional level, the system 200 comprises a plurality of co-dependent subsystems that are capable of asynchronous running. The system 200 comprises a data discovery engine 210, a persistence (e.g., a database) 240, a recommendation engine 220, a front end 230, a gaming platform 250 (i.e., matching and validation gaming platform), and a REST API 260. It should be noted that some of the components within a subsystem can be moved to be part of another subsystem. Moving components in such a manner is superficial and readily apparent to a person of ordinary skill in the relevant art.

The data discovery engine 210 performs two key functions: 1) to inventory files existing in one or more data sources, and 2) to profile the technical metadata of the inventoried data assets (e.g., files and tables). The inventory/profiling processes are accomplished through a job manager application 212 using scalable parallelization of continuous delivery pipelines (such as Kubernetes pipelines) 216.

In one example, the job manager 212 comprises the following group of services:

Scoper: By running a profiling job for each data source with a very small sampling level, the Scoper estimates the resources needed for the inventory/profiling job. This estimation is based on a plurality of factors, including: the amount of resources allocated as specified in configuration files on the data sources, the number of data sources across different platforms and locations, and records of previous profiling efforts. The Scoper can also divide the inventory/profiling job into a plurality of subtask chunks.

Task Creator: Based on the subtask chunks created by the Scoper, the Task Creator creates a configuration file for each subtask chunk. The configuration files contain the specifics for connection, the parameters for parallelization, and memory usage.

Job Monitor: The Job Monitor checks whether the subtask chunks are being picked up by workers, the length of time used to complete the subtask chunks, successes and failure in retries by the workers, and when the inventory/profiling job is successfully completed. In some examples, the Job Monitor could be a generic job scheduling program. Notifications may also be sent to a dashboard in the front end and/or as email alerts.

Loader: The Loader collects the output of the workers (i.e., metadata of the data sources) in the form of JSON files and loads these files into a temporary table in the persistence xxx. Once the files are successfully loaded into the temporary table, the data will be loaded into the main tables of the persistence xxx. In some examples, the load process may be called by the job scheduler.

In this example, the workers are Kubernetes pipelines—ephemeral discrete programs that run in virtual machine/containerized environments and are only used as needed. Worker may work on a single or multiple data sources and/or location at the same time.

The decentralized pipelines provide not only a scalable architecture, but also eliminates the need for transporting a large amount of data from the data sources to the persistence over a network. For improved efficiency and network security, the data can be scanned and profiled close to the data sources using containers such as Docker.

Another component of the system 200 is the persistence 240, which stores the metadata retrieved from the data sources, recommendations produced by the recommendation engine, matching and validating game results, and etc. In some examples of the data discovery solution, the persistence 240 could be a back-end database. In other examples, the persistence could be a more complex datastore structure, such as combining databases, queues and files for storing generalizable metadata and a client's private metadata. To improve the searching speed at the front end 230, the system 200 could also be designed to have a cached copy of the database for processing search queries coming from the front end 230. The cached copy and a search index may be periodically updated by the persistence or updated on-demand through the front end 230.

Next, the recommendation engine 220 comprises a match library 222 and a matcher 224. Based on the search term put into the search engine 238 and a list of known patterns held in the match library 224, an automated matching process (i.e., the matcher 224) matches the end user's search term to patterns and stores a plurality of recommendations in the form of files to the persistence 340. Through the persistence 240, the recommendation files will be presented to the end user at the front end 230, where they can be exported and further manipulated.

Figure 3:
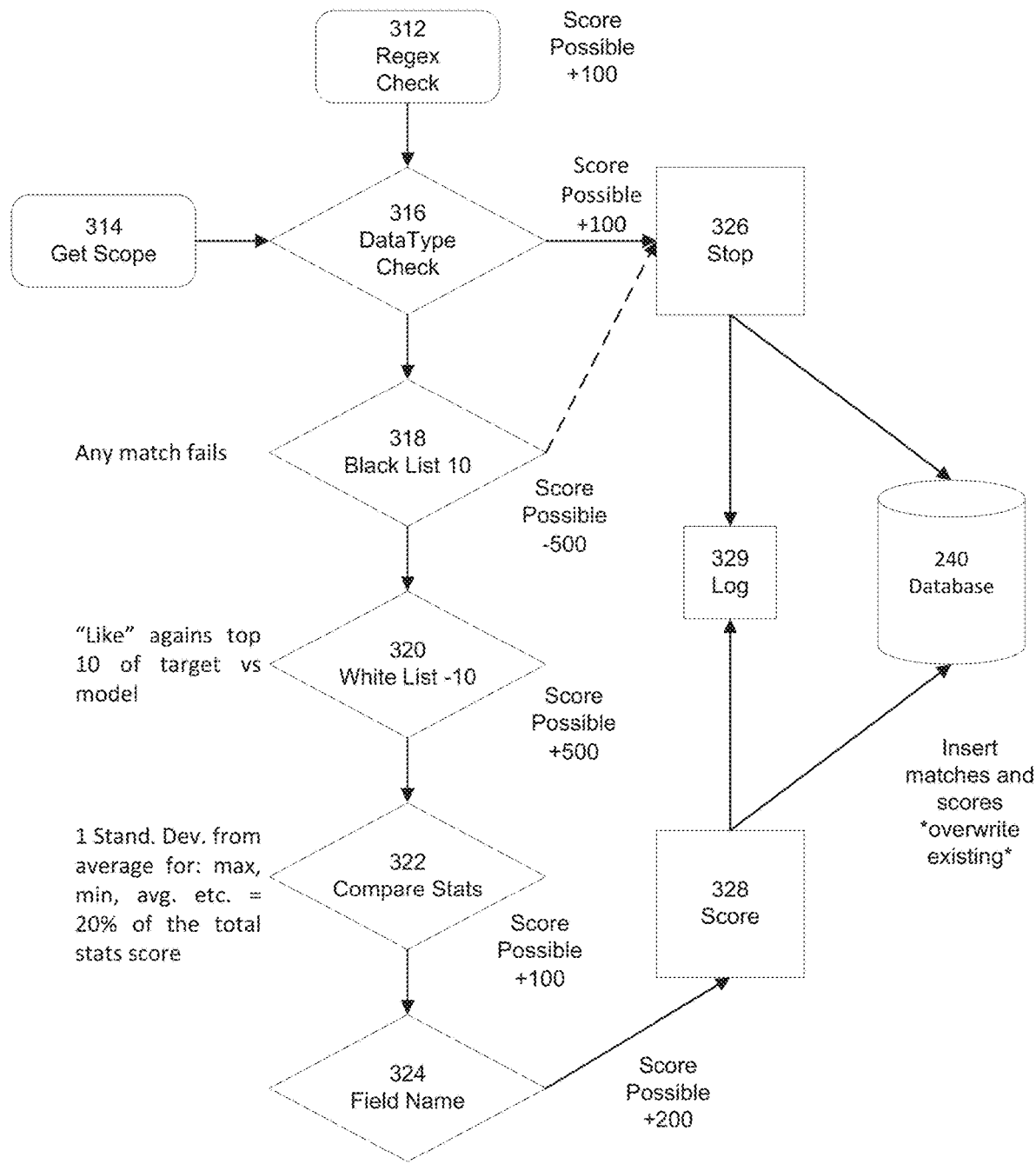
FIG. 3 is a flowchart of an example of a rule process used by the recommendation engine.

FIG. 3 illustrates an example of the foregoing rule process used by the recommendation engine. Consistent with an embodiment of the recommendation engine, the matching confidence level between a search term and a plurality candidate patterns found in the match library can be quantified as an overall score or percentage. To calculate the overall score or percentage, a dynamic self-correcting scoring system is proposed. In going through the matching process, a score is allocated to each candidate pattern at several of the steps; the allocated score being indicative of the matching confidence level under various influencing factors. Based on end user input at the front end 230 and data curation derived from a matching/validating game described herein, the allocable scores in the matching process can be dynamically and automatically adjusted to better calculate the level of matching (i.e., recommendation score) between the search term and each candidate pattern. Furthermore, if the recommendation for a match between a search term and a candidate pattern is not at 100%, the relationship between the search term and the candidate pattern can be converted to into questions and presented to players on the gaming platform 250 for validation.

Referring to the first step in the matching process, the search term is put to a Regex check 312 (i.e., regular expression check) to determine whether it matches any known patterns. For example, if the search term appears in the xxx.xxx.xxxx format, which is commonly associated with the expression of a U.S. phone number, the matching process stops 326 and U.S. phone number is returned to the persistence as a 100% match for the search term. If, however, Regex 312 fails to match the search term to any known regular expressions, the matching process will continue on. Based on the outcome of Regex 312, a corresponding score is allocated to the remaining candidate patterns.

GetScope 314 is an optional step that is also preferably performed at the start of the matching process to improve matching efficiency. GetScope is controlled by the job controller (described below) and GetScope limits the scope of the search by evaluating only patterns that have not been checked by previous iterations of the matching process.

In the next step, DataType Check 316 further reduces the pool of candidate patterns by eliminating patterns with data types that do not match that of the search term. For example, if the search term is a number, then patterns that are strings would be eliminated from further consideration. Based on the outcome of DataType 316, a corresponding score is allocated to the remaining candidate patterns.

After narrowing down the list of candidate patterns, the remaining candidate patterns are compared to a plurality blacklisted patterns and whitelisted patterns. The whitelist 320 and the blacklist 318 respectively represent patterns that the search term will likely match and not likely match. For example, where the search for a sematic term is "first name," A specific value of "Smith" could be a blacklisted pattern for it because it is typically not a "first name" although other aspect of the metadata may allow for matching as "first name". Conversely, if the search term was "last name," then "Smith" could be a whitelist pattern because it is typically associated with being a last name. If a candidate pattern matches a whitelisted pattern, then that candidate pattern is allocated a positive score. Conversely, if the match is to a blacklisted pattern, then that candidate pattern is allocated negative matching score. Consistent with an example of the scoring system, the matching score may be calculated using a probabilistic data structure, such as a bloom filter. The matching score may be further adjusted via a self-correcting modifier that tweaks the weight of blacklist and whitelist scores based on end user feedback/suggestions at the front end 230 and the results of the matching/validating games 250. In this example, matching a candidate pattern to a whitelisted or blacklisted pattern may have significant impact on the candidate pattern's total score, but it does not automatically result in the candidate pattern being recommended or rejected as a match. Alternatively, the matching process can be designed such that a candidate pattern will be automatically Next, the Compare Stats 322 step performs a comparison of the technical metadata of the candidate patterns, such as the maximum, minimum, average, nullability, selectivity, and other statistics. Based on the outcome of Compare Stats 322, a corresponding score is allocated to the candidate patterns. This may also include Natural Language Processing metadata measures such as:
  extracting entities—such as companies, people, dollar amounts, key initiatives, etc.;
  categorizing content—positive or negative (e.g., sentiment analysis), by function, intention or purpose, or by industry or other categories for analytics and trending;
  clustering content—to identify main topics of discourse and/or to discover new topics;
  fact extraction—to fill databases with structured information for analysis, visualization, trending, or alerts;
  relationship extraction—to fill out graph databases to explore real-world relationships.

Lastly, an optional Field Name Check 324 is performed, wherein the search term and field names found in the candidate patterns are normalized and compared to each other. Here, normalization means that the search term and the field names are stripped of commonly used delimiter symbols and converted to the same letter case for comparison. For example, the field names "First Name", "first_name", and first.name" are semantically identical, but they are recognized by artificial intelligence as different from each other. Field Name Check 324 would normalize all the above field names into the same format, such as "firstname", which is a form that can be recognized by artificial intelligence as being equivalent. Based on the outcome of Field Name Check 324, a corresponding score is allocated to the candidate patterns.

After completing the above steps, the score from each step (where available) are summed to calculate a total score 328 for each candidate pattern. The total score 328 for each candidate pattern forms the basis for assessing match confidence level between the candidate pattern and the search term. As an optional step, the total score 328 can be converted to a percentage format, wherein a key pair would have a match confidence level of 100%. After counting the total score 328 (or percentage), the candidate patterns and their respective total score (or percentage) are returned to the persistence 240. As another optional step, actions performed in the matching process can be recorded to a log file 329 for further analysis.

Returning to FIG. 2, the front end 230 is a customer-facing web-based platform, such as a client portal. According to an example, the front end 230 allows end users to search terms (e.g., business terms), view data information, and purchase data. In this example, the front end 230 comprises a catalog 232 and a search engine 238. The catalog 232 allows end users to search for curated community public datasets via the search engine 238, peruse the search results, export data, and purchase data. Optionally, the front end 230 can also have an end user rating and review feature 234 that allows the end users to improve the pattern match process by providing feedbacks and suggestions. As an example, the end-user can give a "thumbs-up" or "thumbs-down" review to a match recommendation. The end user's feedback will be stored to the persistence and then collected by the recommendation engine 220 to improve the dynamic and self-correcting matching process described above. In another example, the end user can add additional tags to data to improve the profiling. Other features that the front end 230 may have include being able to display various statistics for business terms, such as definitions, synonyms, popularity, and frequency of use.

Another subsystem in the data discovery system is the gaming platform 250, which comprises a job manager 252 and a plurality of computing devices. The gaming platform 250 can be implemented as an "app" on a computing device 254, e.g., a desktop, a laptop, a smartphone, a tablet, or a wearable device. The job manager 252 functions as a game server. From the players' perspective, the job manager 252 allows players to play matching or validating games using computing devices 254, create player account, view in-game achievements/rankings, redeem prizes, change settings, and etc. From the system's perspective, matching and validation results generated by players are sent through the job manager 252 to the persistence 240 and are stored for various uses by other components of the data discovery system 200. Furthermore, the job manager 252 randomizes the questions among multiple players to prevent players from reconstructing datasets based on the questions. Specifics regarding the gaming platform and the mechanics of the matching and validating games are discussed later in this disclosure.

The data discovery system 200 also has an API (application programming interface) for interfacing components of the data discovery system 200 with each other or with external applications 270. In an example, the API could be a REST API 260, which can take advantage of existing protocols, such HTTP (HyperText Transfer Protocol) when it is used as a web API.

Figure 4:
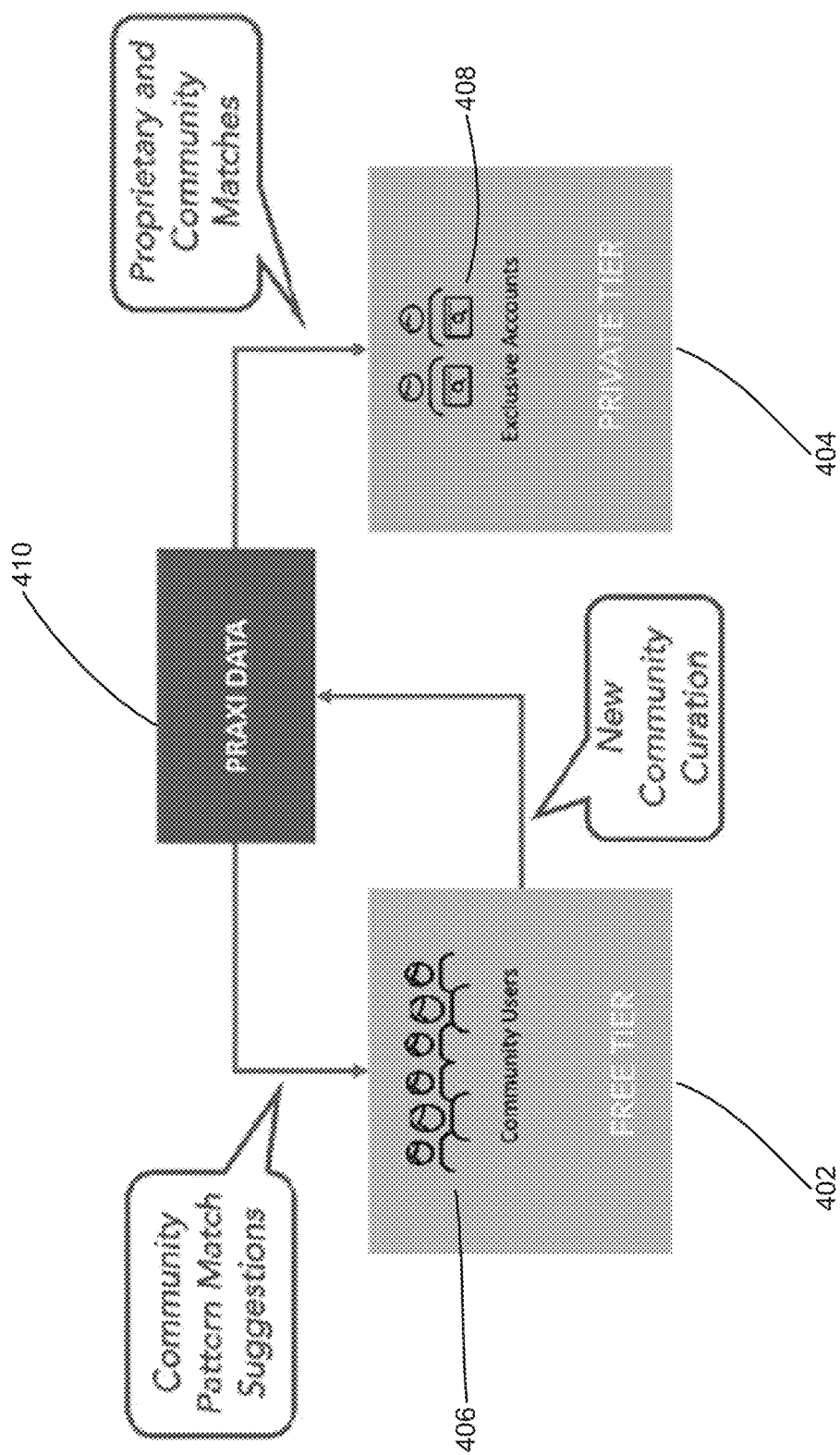
FIG. 4 is a block diagram of generating pattern matches using the data discovery solution, consistent with various embodiments.

FIG. 4 is a block diagram of generating pattern matches using the data discovery solution 410, consistent with various embodiments. The data discovery solution 410 can have various tiers of access to data curation. In a free tier 402, the pattern matches are generated based on inputs received from public users 406 for publicly available data. In a private tier 404, the pattern matches are generated based on (a) pattern matches generated by the public users 406 of the free tier 402 and (b) pattern matches generated by a restricted set of users 408, such as employees of an organization on private data, such as data assets associated with the organization.

Figure 5:
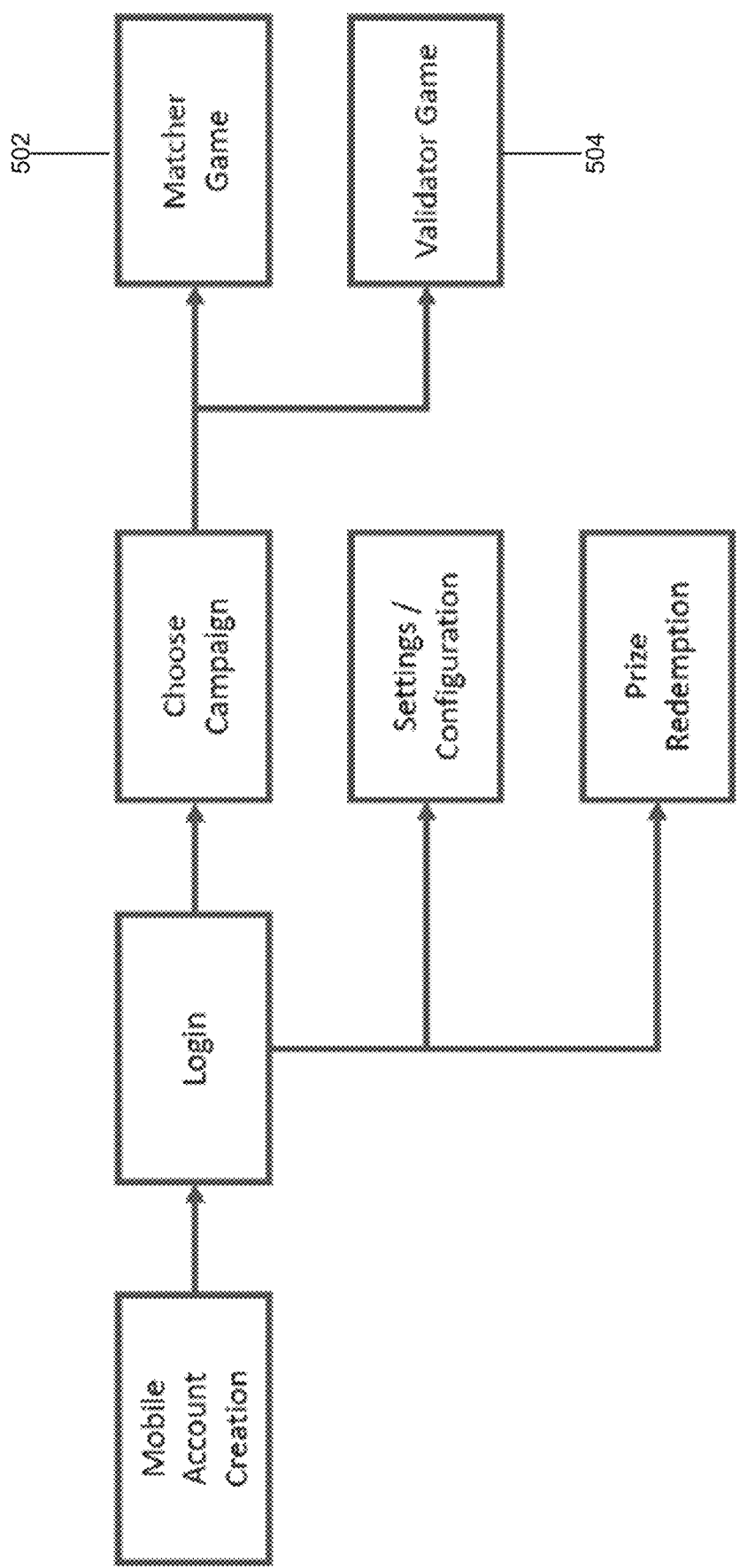
FIG. 5 is a block diagram of a gaming platform of the data discovery solution, consistent with various embodiments.

FIG. 5 is a block diagram of a gaming platform of the data discovery solution, consistent with various embodiments. The gaming platform provides a way for curating data, e.g., generating and validating pattern matches, using a crowd sourcing technique. The gaming platform can be implemented as an "app" on a computing device, e.g., a desktop, a laptop, a smartphone, a tablet, or a wearable device. Using the gaming platform, the data discovery solution obtains several mappings of the technical data to the semantic data from several users by having the users provide the mapping via a game. These mappings are validated and then used for managing the data catalog. The gaming platform includes a matcher game 502 and a validator game 504. The purpose of a matcher game 502 is to create a mapping between semantic metadata and technical metadata, which effectively joins business terms with data assets (or technical metadata) such as a file, schema, or a column in a table. The validator game 504 is to be used for validating suggested tags associated with a data element or a data object—mapping this technical data to semantic metadata and vice versa. The advantage of such gaming platform is that one can obtain best data identification—a significantly large number of taxonomies, most current pattern library, and low false positives.

The purpose of the matcher game 502 is to create the mapping between semantic metadata and technical metadata—effectively joining business terms with data assets such as a file or column in a table. This game may be targeted to users with specific knowledge of the given taxonomy—known as campaign game. A random campaign may also be available, in which the game questions are based on randomized questions from various taxonomy classes. In some embodiments, players of this game will be vetted by user application, referral, or achievement in the validator game.

The matcher game can be configured to direct gameplay to prioritized taxonomy classes from the web app. For example, the matcher game can focus on a specific portion of the insurance taxonomy ACORD standard, geographic region or other demographic group. In some embodiments, private matcher games can be used internally within an enterprise to crowd source mappings and improve deep learning models.

The validator game 504 can be used for validating suggested tags associated with a data element or a data object—mapping this technical metadata to semantic metadata and vice versa. Another objective of this game is to use crowd sourcing technique to validate and rate the matches for false positives as well as other validators from both human and machine efforts. In some embodiments, for public games only publicly available data may be used. Validator for Data Element Tags—e.g., column or name value pair

- A pool of questions may be created where auto-suggested (recommended by machine) or expert suggested tags are available but not confirmed. One of the top values is used together with a suggested term to confirm or reject the match. Thus, the result will be a family of questions created to validate a particular matching tag/term for a data element.
- Answers for each value will allow to whitelist or blacklist a value as a match for a particular term based on defined rules.
- Once an acceptable confirmed/rejected ratio and required volume of participation are reached the term will be matched or rejected and relevant family of questions will be removed from the pool.
- The whitelists, blacklists produced together with a pattern for a term along with relative weighting will be used for future pattern matching.

Validator for Data Object Tags (Concept Validator)

- A pool of questions should be created where auto-suggested or expert suggested tags are available but not confirmed. A tag for an object is based on combination of tags for elements that it incorporates. A list of known element tags is suggested to match to suggested object tag. Relevant element tags need to be picked as matching to an object tag. Basically, while object can be tagged with any tag matched to its element that is has limited usefulness. Rather we are interested in composite terms/tag matching to an object. An example would be the concept of a "customer" which is composed of other terms such as first name, last name and an address.
- Upon acceptable participation and confirmed/rejected/skip ratio received, the object match to a term will be confirmed and relevant questions removed from the pool.
- The validator game will incorporate a random number of known answers. This is used to assess the validator game players. If a player's responses show that quality of response is below a minimum threshold, the player's performance valuation (scoring) will be impacted or the player may be prohibited from playing for a set period of time.

The validator game will also validate manual curators (matcher game) or data curators (stewards). The results of the validator game will help assess the performance for these personas as well.

The validator game will also assess correctness or quality of artificial intelligence (AI)/Deep Learning models. As the validators themselves, matcher game players and human curators are being assess so is the Deep Learning outputs and models.

The validator game can be configured to re-evaluate existing tags and tag-relationships based on time or categorization or a combination of the two with other factors. This functionality will ensure that all mappings are current and used correctly.

Figure 6:
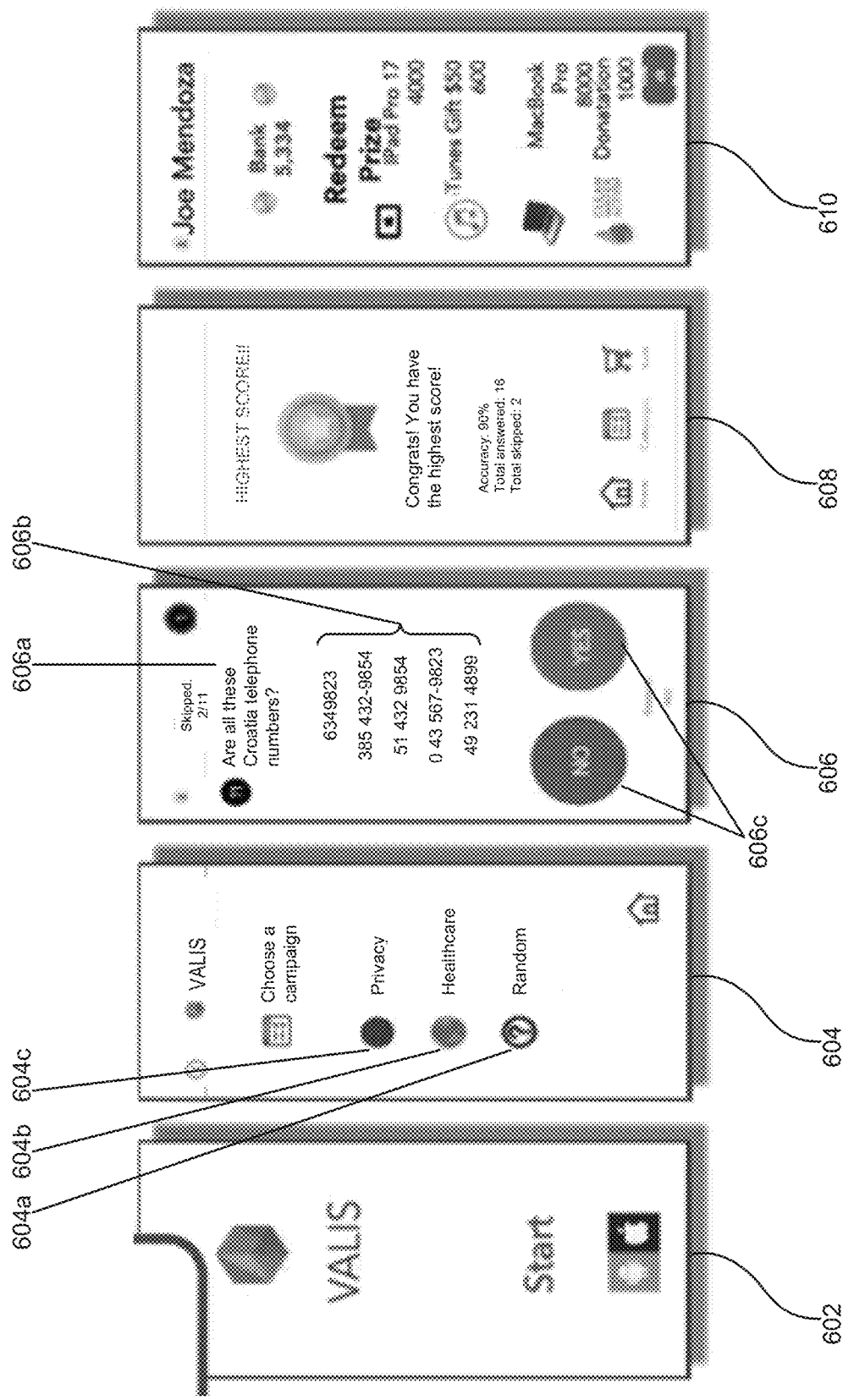
FIG. 6 is a plurality of screenshots of the matching and validating game.

FIG. 6 illustrates several screenshots of the matching and validating game described in above. The first screenshot shows the starting screen 602 from which a player may go to login and track his/her achievements in the game. Next screenshot shows the campaign selection 604. As mentioned above, a player may select campaigns that focus on questions pertaining to a specific taxonomy class, or choose a random campaign 604c in which the questions will randomized from various taxonomy classes. As shown in this example, some of the campaigns may be directed to questions specifically relating to the areas (i.e., taxonomy classes) of data privacy 604a and healthcare 604b. The third screenshot is an example of a validating game question 606. In some embodiments, the question would have a question prompt 606a, a set of validating data 606b, and a plurality of answer choices 606c. For example, the type of answer choices may be binary (i.e., yes/no), multiple choices, or an option to skip the question. In this particular example shown in the screenshot, the player is prompted to answer "yes" or "no" as to whether a list of phone numbers originate from a specific geographical region. The type of information learned from this question may be useful in helping business users of the data discovery system in identifying whether their clients are residents of the European Union, which would subject the business users to special privacy law considerations. The two remaining screenshots show the in-game achievement screen 608 and the redeem prize screen 610.

Figure 7:
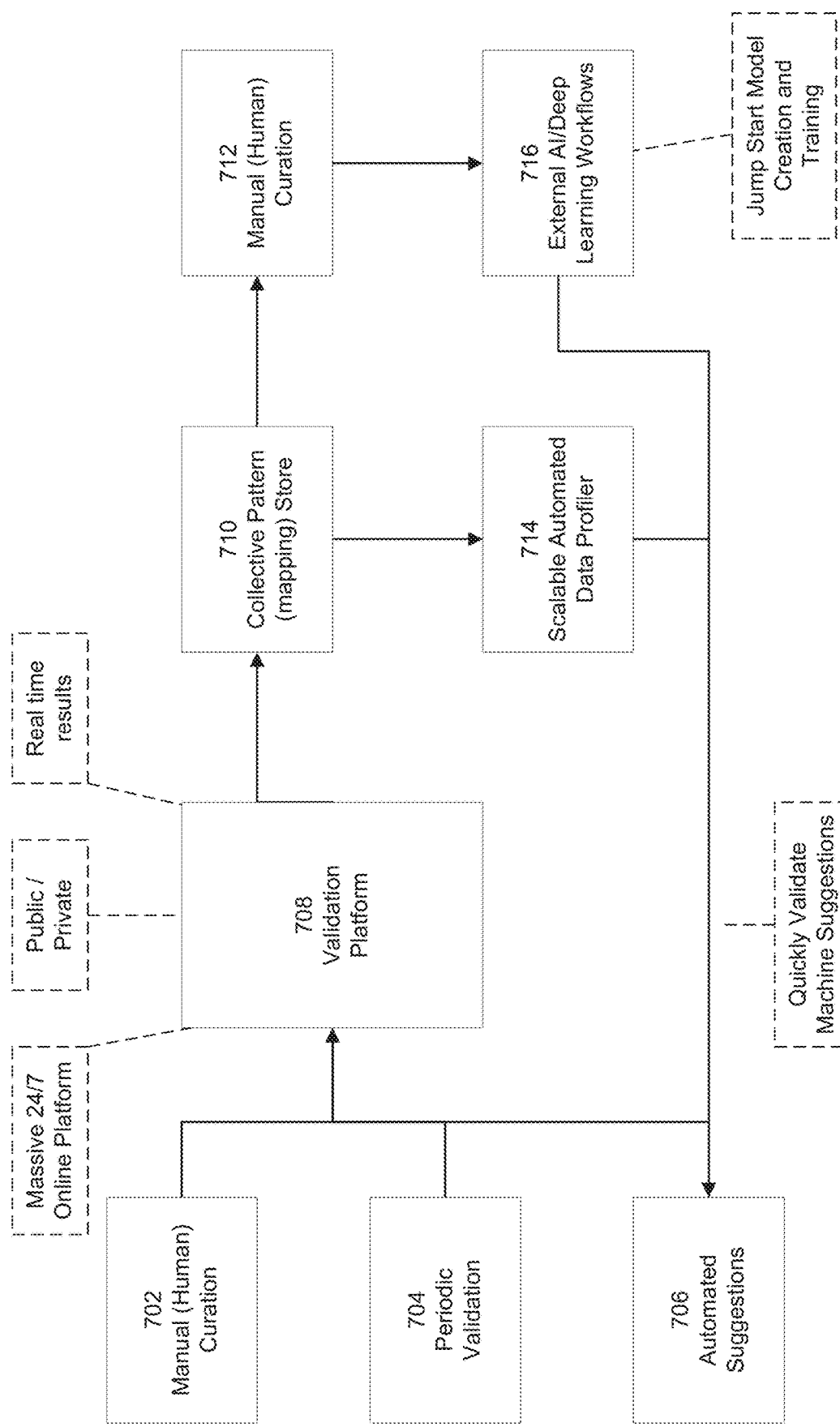
FIG. 7 is block diagram of the validation platform flow.

FIG. 7 Is a block diagram which shows the validation platform workflows. Validation tasks can be configured to validate human curation 702 (stewards), update and confirm past validations 704, and suggestions from automated (machine) sources 706. The product of these validations (patterns) are stored in a collective pattern store 710, where it can be viewed and searched through a catalog 712 in the system front end.

In turn, the updated patterns are used to create better automated suggestions through profiling 714. Likewise, the patterns help to create artificial intelligence/deep learning models 716. The results of these models are then validated as well—with the results also being fed back into the collective pattern store 710.

The validation platform 708 is scalable and runs asymmetrically. The validation platform 708 may be segmented to public and private areas. Visibility of the private and public areas is controlled through detailed access control lists per user or organizational group.

Matcher Game

In some embodiments, a game is a set of yes/no questions, multiple-choice questions or skip. User can complete the game by answering questions and can receive a reward for participating.

A game should may have a specified number of yes/no/skip questions.

For each game step the following elements may be shown:
A sample data value
A term (common from taxonomy)
Yes/no/skip options Data value and term should be visually connected/associated. Options can be represented by gesture actions (swipe/drag etc.).

User can earn "coins" or "points" for "correct answers" at the end of the game, where correct answer can change with time and can be a result of "crowd opinion on the match". After a certain threshold number of answers are received user answers are evaluated against machine's or expert opinion.

Correct answers may not be shown, rather a "crowd approved" score with respect to a correct answer may be shown at the end of the game. Bonuses may be awarded after a certain "question" is closed and final answer is known (i.e., relevant data is tagged).

Scores will not be shown for give question or challenge but at the end of the session or campaign. This is to keep the known rating test questions/components secret.

Users may be penalized for random answers. Random clicks on yes/no may be detected and coins earning may be reduced based on that. A dynamic number of known questions or challenges will be presented for this purpose.

User can redeem coins for rewards.

Leaderboard should be available as well as badges to recognize achievements.

Mobile Game Features

User may have to register/login in order to participate. Demographic information will be submitted, such as age range, income bracket, interests, language, email, location region (city level only).

The user selects a campaign. Not all campaigns are available to all users. Some campaign may be limited by registration information such as region or language. Additionally, private campaign may be limited by organizational group (company).

The game allows the user to pause a game and continue a paused game.

The game allows the user to answer or skip a question.

Notifications are generated to indicate to a user that random answers have a penalty. Random answers will be detected through various means including posing questions/challenges of known answers as noted below, e.g., para. 28.

The game can display game results, including the score (which may be hidden), the coins awarded and penalty if applicable on game completion.

The game can display a rating of the user on the leaderboard and any applicable badges.

Achievements will be published if opted in by play on game site or social media, such as Facebook or LinkedIn.

The game allows the user to redeem coins for monetary value or entry into sweepstakes.

The game can reward user's time, which may be a factor that impacts score

Data Element Tags: One of the versions is to allow the user to pick a term (tag) for a data value of list of values (sample data). In some embodiments, the rules for establishing a match as "confirmed" can be defined based on how all sample values are accepted as a match to the same term etc. In some embodiments, a match "confirmed" means that the term is suggested as a possible match for a data element and can be followed by an expert-approval step or crowd-source confirmation via a validator game.

Matcher for Composite Terms (Concept Builder): In some embodiments, the game goal is to allow user to pick a term (tag) based on either identified data element tags or data object metadata. Note the concept may involve multiple data objects.

Validator game rules—algorithms (can be configurable):
Players:
  Player test questions (known answers):
    Initial player or correct threshold below 70%-50% of questions should be tests
    Rating of =>80%-40% of questions should be tests
    Rating of =>85%-30% of questions should be tests
    Rating of =>90%-20% of questions should be tests
    Rating of =>95%-10% of questions should be tests
    Rating <70 or 60% for a specified number of consecutive games or a specified number per month, player should be suspended.

Thus, the number of times a specific question or challenge is presented is based upon the accuracy of the validations and matches. This dynamic nature should be self-monitoring and self-managing resources.

Game Dynamics:
  Bonuses may be designed to be additional game dynamics to increasing interest, challenge, and reward.
  Badges may be provided as icons for all bonuses. Additionally, there can be badges for knowledge experts for a given taxonomy. For example, if the challenge or the campaign is based on a taxonomy for insurance, the high score and badge earner can receive a special certificate or reference that can be used in social media.

Data Validation

The mobile game dynamics need to be self-regulating and self-correcting. This can be done with a set of rules that will determine the number of times validation is checked, the number of times in validation as correct and the number of times that it is false or skipped.

Example baseline: Validated (with special icon in catalog)=3 consecutive validations-(can be configurable)

| No | Yes | Total |
|---|---|---|
| 0 | 3 | 3 |
| 1 | 5 | 6 |
| 2 | 10 | 12 |
| 3 | 12 | 15 |
| 4 | XX | Failed |

In some embodiments, a target audience of the data cataloging service facilitated by the data discovery solution is a technology worker (e.g., an enterprise) who is faced with the governance, analytic or compliance challenge of "Big Data." In some embodiments, a target audience for the games is a technology literate adult.

In some embodiments, the general principles of the data discovery solution are that metadata should be captured as close to the source as possible, metadata once captured should be preserved, preserving, or keeping metadata preferred to reconstruction or inferring new metadata, and that metadata is essential for the proper use in extracting value from data.

Some of the data catalog user roles include a data steward, game platform administrator, data analyst, chief data officer (CDO), data engineer, and data protection officer (DPO). A data steward can be a user in charge of authoritatively curating and categorizing data for a department or enterprise. Additionally, this person may be responsible for creating the domains to drive the gaming platform game. A data analyst can be responsible for adherence, review and reporting of regulatory or compliance rules. The data analyst can also be charged with interpreting the language requirements and validating that the technical implementation is correct. The CDO can be responsible for overall governance and management of the entire data enterprise. The data engineer can be responsible for the transfer of data from one point to another or to procure and make available data to consumers such as data analysts or data stewards. This domain can cover the technical aspects—care and feeding—and completeness of data but not the content of the payload itself. So, the CDO may be required to encrypt the data but not know what's inside of it. The DPO can be responsible for compliance specifically spelled out in GDPR regulations. Additionally, this person would represent the enterprise to external regulators and have to answer questions regarding compliance.

In some embodiments, the entities of the data discovery solution include:
  Data set: a file or a collection of files or a database table/view, message queues, streams;
  Table: a database table which is accessed through a SQL interface, logical or materialized in traditional databases;
  File: a singleton or a collection of files that represent a data set. These will have a common schema across all files that are grouped at the data set
  Schema: a mapping of data elements to name value pairs or a table or file.
  Tag: a flag associated with the data element or a table or file. A tag does not have a value.
  Property: an attribute of an entity which can have a value.
  Terms: business terms or object that are logical or friendly synonymous with tag.
  Glossary: extended annotations and threaded conversations about a topic which can be a business term or a business object.
  Transform: SQL function, programmatic process or business process (compliance) flow. does not create or manage these but must respect its relationship to other entities by persevering as much metadata as possible.
  Web App: Software as a service (SaaS) Catalog: HTML-based catalog service that allows search, compliance, dash boarding, configuration & scanning of data sources, configuration of web application and export data assets for analytics
  Profiler Process: Reads assets and intro specs the contents and calculates statistical demographics.
  Matcher Process—matches technical metadata with semantic metadata based on patterns and models.
  Mobile App—A mobile application that allows matching and validations of those matches. The results of these validated matches of semantic and technical metadata are then forwarded to the web app catalog.

Figure 8:
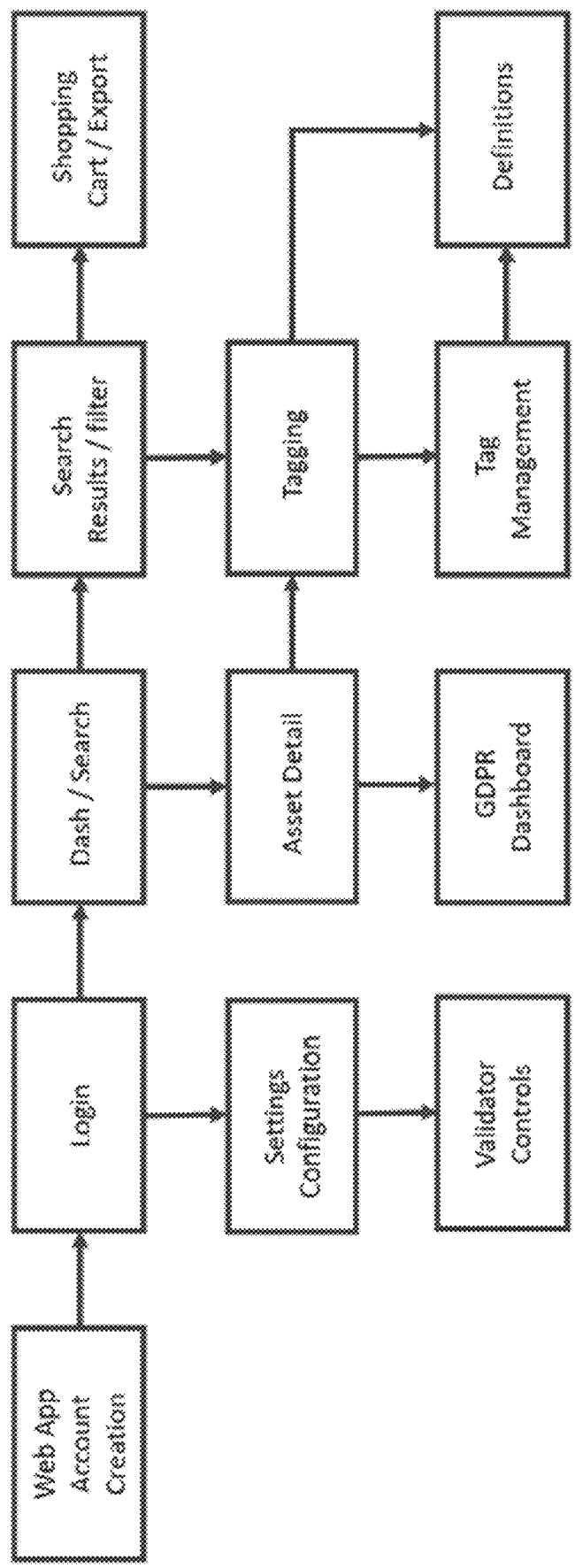
FIG. 8 is a screenshot of a question from the validator game described herein.

FIG. 8 is a block diagram depicting a web application for configuring the data discovery solution, consistent with various embodiments. The web application is implemented as SaaS catalog, which can be HTML-based catalog service that allows search, compliance, dash boarding, configuration & scanning of data sources, configuration of web application and export data assets for analytics.

Figure 9:
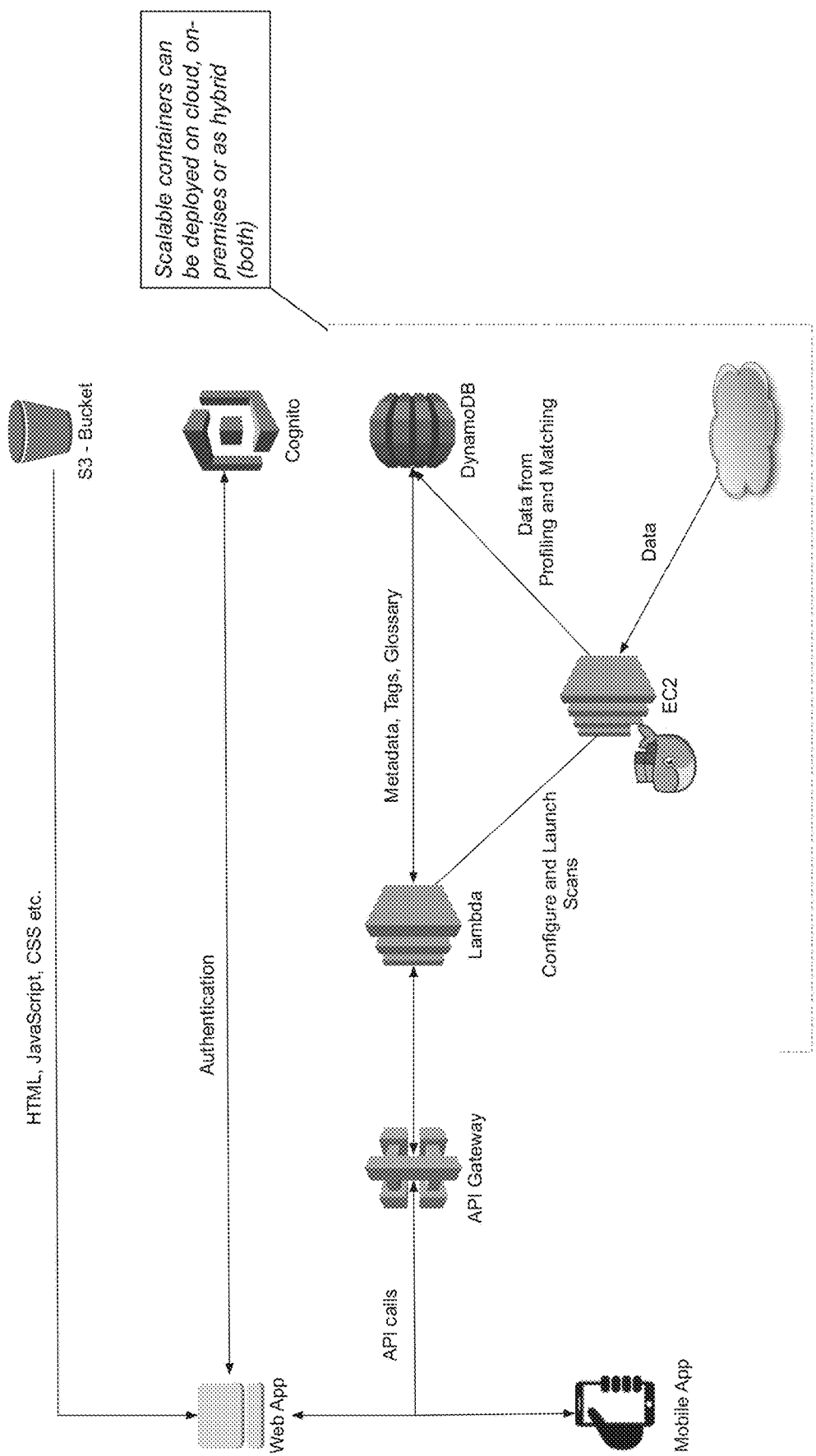
FIG. 9 is a block diagram depicting a web application for configuring the data discovery solution, consistent with various embodiments.

FIG. 9 is a block diagram depicting a service architecture of the data discovery solution, consistent with various embodiments. The services architecture diagram depicts an architecture of the data discovery solution, e.g., using components for amazon web service (AWS) as native services. However, by leveraging containerization and appropriate application state design, deployment of the data discovery solution can be independent of a cloud service provider and may be made not be tied to a specific cloud provider. The architecture assumes the presence of foundational native cloud services, which will provide a resilient and reliable set of services such as:

Object Store

Highly reliable and performant relational (SQL) persistence

Authentication service

API Gateway that has scalability triggers

Scalability capabilities which can manage instances of containers.

Figure 10:
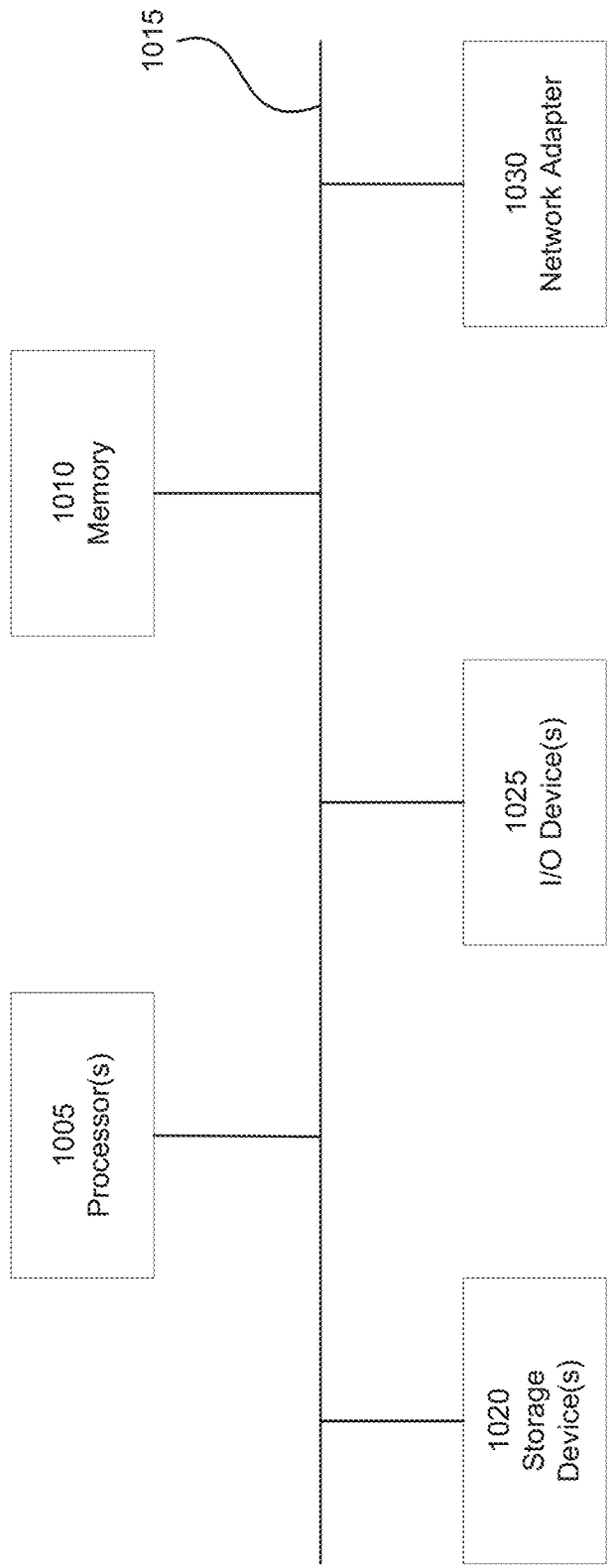
FIG. 10 is a block diagram depicting a service architecture of the data discovery solution, consistent with various embodiments.

FIG. 10 is a block diagram of a computer system as may be used to implement features of the disclosed embodiments. The computing system 1000 may be used to implement any of the entities, components, modules, systems, or services depicted in the examples of the foregoing figures (and any other entities described in this specification). The computing system 1000 may include one or more central processing units ("processors") 1005, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1010 and storage devices 1020 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 1010 can be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, sub steps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method of generating a set of candidate patterns corresponding a search query comprising:
   identifying a corpus of patterns for evaluation compared to the search query that do not match a data type of the search query, wherein the corpus of patterns is generated using a crowdsource-based gaming application with a plurality of players by:
   transmitting, via a corresponding matching gaming application, a matching game question to a first player of the plurality of players, wherein the matching game question is configured to solicit a player-response that matches a dataset to a tag and establish a new pattern of the corpus of patterns;
   receiving, via the corresponding matching gaming application, the new pattern from the first player; and
   storing the new pattern to a database;
   reducing a search score of a first subset of patterns of the corpus of patterns that match a blacklisted pattern associated with the search query by a first amount, wherein the first amount is dynamically determined by a variable user-validation metric;
   increasing a search score of a second subset of patterns of the corpus of patterns that match a whitelisted pattern associated with the search query by a second amount, wherein the second amount is dynamically determined by the variable user-validation metric;
   increasing a search score of a third subset of patterns of the corpus of patterns that match the search query to any of a plurality of technical metadata of datasets associated with the third subset of patterns by a third amount, wherein the third amount is dynamically determined by the variable user-validation metric; and
   listing patterns ranked according to corresponding search scores.

2. The method of claim 1, further comprising:
   increasing the search score of a fourth subset of patterns of the corpus of patterns based on a comparison of the search query to a plurality of normalized field names of datasets corresponding to the corpus of patterns.

3. The method of claim 1, wherein the search score is determined using a probabilistic data structure.

4. The method of claim 3, wherein the probabilistic data structure is a bloom filter.

5. The method of claim 1, wherein the search score is expressed as an overall score or a percentage of confidence level.

6. The method of claim 1, wherein the variable user-validation metric is based on a plurality of revised patterns generated using a crowdsource-based gaming application with a plurality of game players.

7. The method of claim 1, wherein the variable user-validation metric is based on a user feedback generated by:
   embedding in a user interface a set of interactive icons that are configured to submit positive feedback and negative feedback to a respective pattern of the corpus of patterns; and
   dynamically adjusting the search score of the respective pattern by:
   reducing by the first amount when the user feedback is negative feedback; and
   increasing by the second amount if the user feedback is positive feedback.

8. The method of claim 1, further comprising:
   transmitting, via a corresponding validator gaming application, a validator game question to a second player of the plurality of game players, wherein the second player is identified based on a reliability rating of the second player, wherein the reliability rating of the second player is based on a previous history of responses to validator game questions by the second player, and wherein the validator game question is configured to solicit a player-response that confirms or rejects the new pattern;
   receiving confirmation from the second player regarding the new pattern via the corresponding validator gaming application; and
   after receiving a threshold number of confirmations from among the plurality of game players including the second player, validating the new pattern as a whitelisted pattern.

9. The method of claim 8, further comprising:
   transmitting, via the corresponding validator gaming application, the validator game question to a third player of the plurality of game players, wherein the third player is identified based on a reliability rating of the third player;
   receiving a response to the validator question from the third player; and
   updating the reliability rating of the third game player based on whether the response of the third game player matches the confirmation of the second game player.

10. A method of validating a plurality of unvalidated patterns using a crowdsource-based game application with a plurality of players, wherein the unvalidated patterns associate a plurality of tags to a plurality of datasets discovered from one or more data sources comprising:
    transmitting, via a corresponding matching gaming application, a matching game question to a first player of the plurality of players, wherein the matching game question is configured to solicit a player-response that matches a dataset to a tag and establish the unvalidated pattern;
    receiving, via the corresponding matching gaming application, the unvalidated pattern from the first player;
    transmitting, via a corresponding validator gaming application, a validator game question to a second player of the plurality of game players, wherein the second player is identified based on a reliability rating of the second player, wherein the reliability rating of the second player is based on a previous history of responses to a set of test questions by the second player, and wherein the validator game question is configured to solicit a player-response that confirms or rejects the unvalidated pattern;
    receiving confirmation from the second player regarding the unvalidated pattern via the corresponding validator gaming application; and
    after receiving a threshold number of confirmations from among the plurality of game players including the second player, validating the unvalidated pattern as a whitelisted pattern;
    storing the whitelisted pattern with a corpus of patterns; and
    execute a recommendation engine that compares the corpus of patterns to search queries wherein a search rank is based on a variable user-validation metric, wherein the variable user-validation metric is based on a plurality of revised patterns generated using a crowdsource-based gaming application with a plurality of game players.

11. The method of claim 10, further comprising:
    transmitting, via the corresponding validator gaming application, the validator game question to a third player of the plurality of game players, wherein the third player is identified based on a reliability rating of the third player;

receiving a response to the validator question from the third player; and updating the reliability rating of the third game player based on whether the response of the third game player matches the confirmation of the second game player.

12. The method of claim 10, further comprising:

transmitting a follow-on question to the second player, wherein the follow-on question is a test question of the set of test questions or a second validator game question, wherein a probability of the follow-on question being the test question is based on the reliability rating of the second player.

13. The method of claim 12, wherein the probability of the follow-on question being the test question is:

50% if the reliability rating of the second validator game player is less than 70%;

40% if the reliability rating of the second validator game player is greater than or equal to 80% but less than to 85%;

30% if the reliability rating of the second validator game player is greater than or equal to 85% but less than to 90%;

20% if the reliability rating of the second validator game player is greater than or equal to 90% but less than to 95%; and 10% if the reliability rating of the second validator game player is greater than or equal to 95%.

14. The method of claim 10, further comprising:

determining the first player based on an association of a demographic identifier of the first player with the dataset, wherein the demographic identifier includes any of a geographic connection, a knowledge expertise, an age range, an income bracket, a personal interest, and a language spoken.

15. The method of claim 10, further comprising:

determining the first player based on a previous history of responses by the first player, wherein the previous history of responses of a given player of the crowdsource-based game application indicates the given player having specific knowledge in a taxonomy class associated with the dataset.

16. A system comprising:

a memory including a database configured to store a corpus of patterns;

a search engine configured to receive a search query and return a set of results including a set of patterns of the corpus of patterns ranked according to corresponding search scores;

a recommendation engine having instructions stored in the memory, the recommendation engine including a recommendation algorithm, wherein the recommendation algorithm causes an executing processor to:

identify a corpus of patterns for evaluation compared to the search query that do not match a data type of the search query;

reduce a search score of a first subset of patterns of the corpus of patterns that match a blacklisted pattern associated with the search query by a first amount, wherein the first amount is dynamically determined by a variable user-validation metric;

increase a search score of a second subset of patterns of the corpus of patterns that match a whitelisted pattern associated with the search query by a second amount, wherein the second amount is dynamically determined by the variable user-validation metric;

increase a search score of a third subset of patterns of the corpus of patterns that match the search query to any of a plurality of technical metadata of datasets associated with the third subset of patterns by a third amount, wherein the third amount is dynamically determined by the variable user-validation metric; and list patterns ranked according to corresponding search scores; and a crowdsource-based gaming application stored in the memory, the crowdsource-based gaming application including a matcher game component, wherein the matcher game component causes the executing processor to:

transmit a matching game question to a first player of a plurality of players, wherein the matching game question is configured to solicit a player-response that matches a dataset to a tag and establish a new pattern of the corpus of patterns;

receiving the new pattern from the first player; and storing the new pattern to the database.

17. The system of claim 16, wherein the new pattern is validated using the crowdsource-based gaming application, and the system further including instructions that when executed cause the crowdsource-based gaming application to:

transmit a validator game question to a second player of the plurality of game players, wherein the second player is identified based on a reliability rating of the second player, wherein the reliability rating of the second player is based on a previous history of responses to validator game questions by the second player, and wherein the validator game question is configured to solicit a player-response that confirms or rejects the new pattern;

receive confirmation from the second player regarding the new pattern; and after receiving a threshold number of confirmations from among the plurality of game players including the second player, validate the new pattern as a whitelisted pattern.

18. The system of claim 17, the system further including instructions that when executed cause the crowdsource-based gaming application to:

transmit, the validator game question to a third player of the plurality of game players, wherein the third player is identified based on a reliability rating of the third player;

receiving a response to the validator question from the third player; and updating the reliability rating of the third game player based on whether the response of the third game player matches the confirmation of the second game player.

* * * * *